July 8, 1941.  M. LANDESMAN  2,248,766
SELF-CLOSING CONTAINER
Filed Sept. 14, 1939
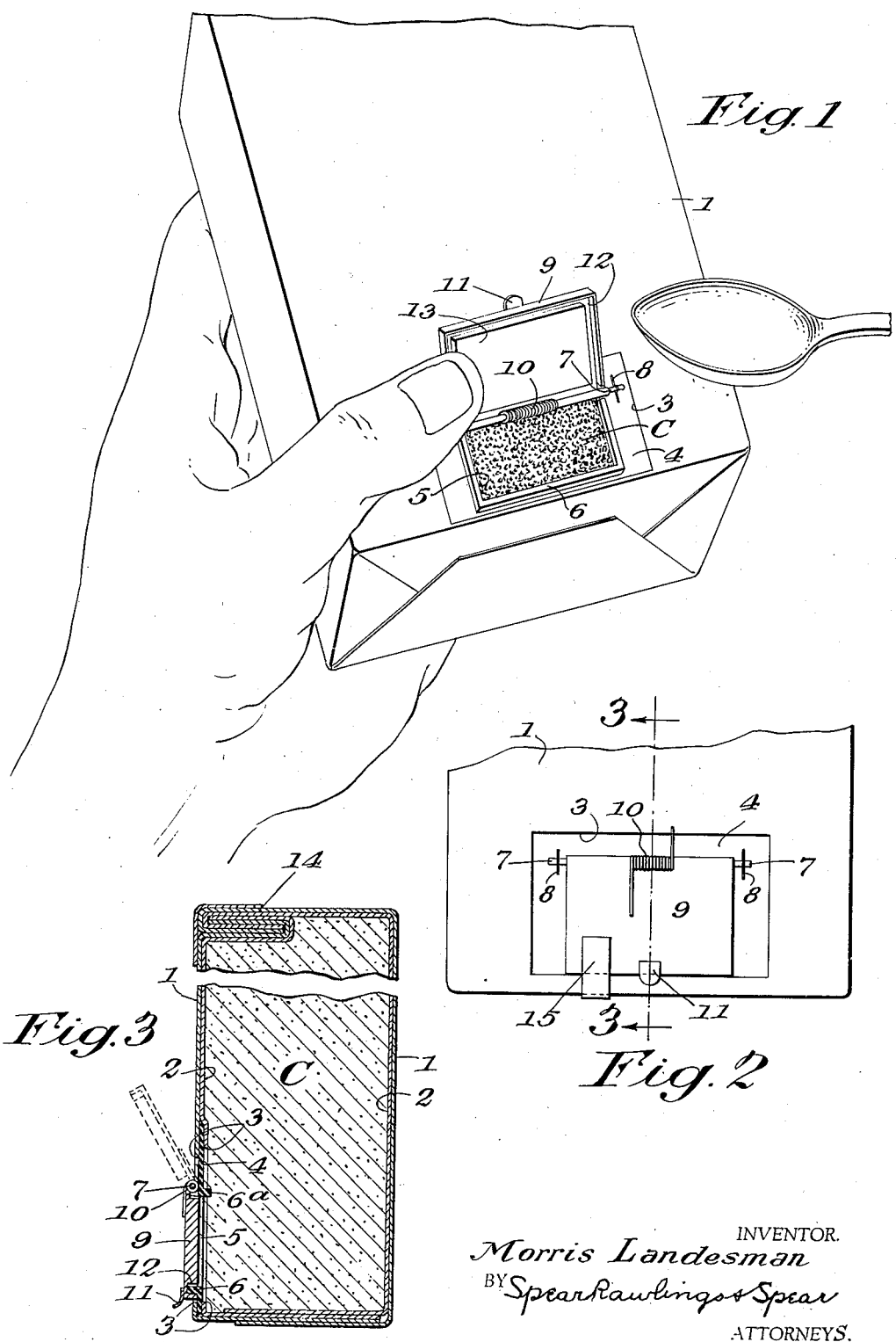
INVENTOR.
Morris Landesman
BY Spear Rawlings & Spear
ATTORNEYS.

Patented July 8, 1941

2,248,766

UNITED STATES PATENT OFFICE 2,248,766

SELF-CLOSING CONTAINER

Morris Landesman, Brookline, Mass.

Application September 14, 1939, Serial No. 294,907

2 Claims. (Cl. 229—7)

My present invention relates to a novel self-closing container that permits the preservation of freshly ground coffee or other similar products until the contents of the container have been completely used.

The widespread use of ground coffee has directed much attention to the problem of ensuring its delivery to the user in proper condition and affords an excellent illustration of the problems with which my invention is concerned. Because exposure to air results in a quick loss of the rich aroma characteristics of freshly ground coffee, it has been the general practice either to grind coffee beans for the individual and to pack the freshly ground coffee in either single or double walled paper containers or to employ the relatively expensive cans in which the coffee was vacuum packed.

While both of these practices ensured delivery to the customer of freshly ground coffee, the user is in no way protected from quick deterioration of the coffee, when its container is once opened. While deterioration of the coffee could be somewhat retarded by the user by promptly closing the container when a sufficient quantity for his beverage had been removed, such care is impracticable and invariably, after the container has been opened a few times, the freshness of the coffee is lost.

In accordance with my invention, I provide a container that is adapted to be delivered to the purchaser with its contents sealed and is provided with a self-closing port that ensures a minimum exposure of the contents to the air when the contents are being removed from the container.

While my invention may be inexpensively incorporated in any container to protect its content during use, I have illustrated it, in the accompanying drawing, as incorporated in a paper or like bag. In the drawing:

Fig. 1 is a view of a characteristic pack according to my invention showing its use.

Fig. 2 shows the pack of Fig. 1 with the port closed, and

Fig. 3 is a section along the lines 3—3 of Fig. 2.

At 1, I have indicated a bag that may be of any relatively impermeable foldable material adapted for use as a container for coffee or the like. Such bags frequently are provided with an inner lining 2.

In accordance with my invention, the bag 1 and the lining 2 are cut away as at 3 to receive between them the relatively rigid wall piece 4 to which the bag 1 and preferably the lining 2 are united as by a suitable adhesive. The wall piece or member 4 may be of any suitable relatively rigid stock but preferably it is moldable and is formed with a port 5 marginally of which is a rim or flange 6 establishing a port of a size adapted to permit a spoon S to be inserted into the bag 1 to remove a desired quantity of its contents. If desired, the member 4 may be formed with the reinforcing flange 6ª that also serves to prevent the packed substance from flowing out when the cover 9 is raised.

A hinge 7 connected to the wall 4 as by staples 8 carries a cover 9 under the influence of a spring 10. The cover 9 may be of any suitable material but preferably, for economical production, is of moldable stock. The cover 9 includes a tab 11 or the like to facilitate in its opening against the action of the spring 10 and is formed with a groove 12 to receive the rim 6 and to establish a projecting portion 13 shaped to fit within the port established by the rim 6 to maintain, by the pressure of the spring 10, the packed granules below the level of the rim 6.

In use, such a container as I have described is filled with freshly ground coffee through the mouth of the bag 1 that is then permanently sealed in any desired way as indicated at 14. The cover 9 is sealed as by the strip 15 that may, if desired, be dated. When the contents are to be used, the sealing strip 15 is broken, and the cover 9 raised. As shown in Fig. 1, the container 1 may be held in one hand with the cover 9 open.

With the embodiment of my invention shown in the drawing, the wall piece or member 4 provides a relatively rigid wall portion to receive the hinged cover and makes possible a tight closure of the bag. When the cover 9 is released, the spring 10 closes it instantly and seals the port tightly and the projecting portion 13 maintains the coffee C below the level of the rim 6 so that when the cover 9 is opened, the coffee C is not readily spilled.

My invention permits coffee containers to be made self-closing at low cost to provide a maximum protection of their contents against deterioration and the ingress of undesirable particles. As I have stated, my novel closing means may be employed with different types of containers but may be used with particular advantage with the well known paper or like bag.

What I therefore claim and desire to secure by Letters Patent is:

1. A container for coffee and the like, said container comprising a paper bag or the like adapted to be sealed and to be collapsed as its contents are consumed, one of the walls of said bag having an aperture therein adjacent the bottom of said bag, a relatively stiff member adherently carried by said apertured wall to close said aperture, said member having an aperture, outwardly disposed flange members on said member defining with said last-named aperture a flanged port, an inwardly disposed flange member carried by said member to establish a dam above said flanged port, a cover for said flanged port hingedly connected to said member, and resilient means urging said cover into port closing position, said cover including a portion to enter within said port to maintain the contents below the outer level of the flanged port and marginal portions to contact said member laterally of said outwardly disposed flange members to seal the bag.

2. The container of claim 1, in which the marginal portions comprise a depending flange spaced laterally of the flange members carried by the member to dislodge any particles on the exterior of the member as the cover is closed by the resilient means to insure a port sealing contact between the member and the relatively narrow depending flange.

MORRIS LANDESMAN.